(12) United States Patent
Zhou et al.

(10) Patent No.: US 6,647,011 B1
(45) Date of Patent: Nov. 11, 2003

(54) METHOD AND SYSTEM FOR SWITCHING USING AN ARBITRATOR

(75) Inventors: Fan Zhou, Cranberry, PA (US); Joel Adam, Baden, PA (US); Joseph C. Kantz, Beaver Falls, PA (US); Veera A. Reddy, Wexford, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/255,197

(22) Filed: Feb. 22, 1999

(51) Int. Cl.[7] .................................................. H04J 3/02
(52) U.S. Cl. ........................ 370/395.41; 370/395.42; 370/395.71; 370/411; 370/415
(58) Field of Search .................... 370/395.4, 395.41, 370/395.42, 395.7, 395.71, 395.72, 415, 416, 390, 425, 426, 429, 462, 411

(56) References Cited

U.S. PATENT DOCUMENTS

| | | | | |
|---|---|---|---|---|
| 5,303,078 A | * | 4/1994 | Brackett et al. | 359/139 |
| 5,361,255 A | * | 11/1994 | Diaz et al. | 370/374 |
| 5,392,279 A | * | 2/1995 | Taniguchi | 370/380 |
| 5,475,679 A | * | 12/1995 | Munter | 370/395.4 |
| 5,555,243 A | * | 9/1996 | Kakuma et al. | 370/352 |
| 5,577,035 A | * | 11/1996 | Hayter et al. | 370/395.4 |
| 5,668,798 A | * | 9/1997 | Toubol et al. | 370/230 |
| 5,841,556 A | * | 11/1998 | Hong et al. | 359/117 |
| 6,021,128 A | * | 2/2000 | Hosoya et al. | 370/380 |
| 6,046,997 A | * | 4/2000 | Fan | 370/395.71 |
| 6,101,183 A | * | 8/2000 | Byers | 370/380 |
| 6,141,346 A | * | 10/2000 | Caldara et al. | 370/390 |
| 6,163,542 A | * | 12/2000 | Carr et al. | 370/399 |

* cited by examiner

Primary Examiner—Min Jung
(74) Attorney, Agent, or Firm—Ansel M. Scwartz

(57) ABSTRACT

A switch for switching traffic from N sources to M destinations, where M and N are each an integer greater than or equal to 2. The switch includes K segments, where K is greater than or equal to 2 and is an integer. Each segment receiving traffic from R of the N sources, where $1 \leq R < N$ and is an integer, and all K segments in total receiving traffic from the N sources. Each segment collecting and queuing traffic from the respective R sources. The switch includes an arbitrator which receives information from the destinations regarding if they can receive data or not, and from the K segments about the traffic they have for different destinations. A method for switching traffic from N sources to M destinations, where M and N are each an integer greater than or equal to 2. The method includes the steps of receiving traffic from the N sources at input ports of K segments, where K is greater than or equal to 2 and is an integer. Each segment receiving traffic from R of the N sources where $1 \leq R < N$ and is an integer. Then there is the step of sending traffic from any segment to a destination through an output port of an arbitrator which connects to each segment. An arbitrator. A segment.

20 Claims, 2 Drawing Sheets

METHOD AND SYSTEM FOR SWITCHING USING AN ARBITRATOR

FIELD OF THE INVENTION

The present invention is related to multi level dequeueing of traffic in switching networks when multiple sources and destinations are involved, with each source having traffic destined to different destinations over multiple prioritized queues. Any scheme that is fair in resource allocation can be used for selection of different prioritized queues. The multi level dequeueing is especially useful for high bandwidth network applications, which makes it feasible to implement scalable switches with current technology.

BACKGROUND OF THE INVENTION

In high speed switching networks, the switch design involves collecting and queueing of incoming traffic (ex: packets or ATM cells) from many sources (ex: physical media). Each source could have traffic destined to different destinations over different priorities. Incoming traffic is queued based on per destination or per-destination and per priority queue. As the number of sources and destinations increase, and/or as each source and destination traffic bandwidth increases it could be impossible to build a switching module that can switch by queueing and dequeueing traffic at very high bandwidths. The technology limitations would make it impossible to build switches beyond certain bandwidth with single level of queueing and dequeueing.

The purpose of the present invention is to build network switches that can scale to any bandwidth by using multi node queueing and multi level dequeueing. Each queueing/dequeueing segment can run only at a fraction of the total bandwidth. The arbitrator collects information from all queues of the lower level dequeueing segments and by processing the information from different segments based on certain algorithm (ex; weighted round robin algorithm) it will give back dequeueing information to each segment. The arbitrator needs to get only enough information from all its lower level segments for current dequeueing interval. For each lower level segment the arbitrator can receive information from both the queueing logic and the destination of the traffic. The approach can be extended to any number of dequeueing levels by giving enough time to transfer the data from the buffer queues to the destinations.

SUMMARY OF THE INVENTION

The present invention pertains to a switch for switching traffic from N sources to M destinations, where M and N are each an integer greater than or equal to 2. The switch comprises K segments, where K is greater than or equal to 2 and is an integer. Each segment receiving traffic from R of the N sources, where $1 \leq R < N$ and is an integer, and all K segments in total receiving traffic from the N sources. Each segment collecting and queuing traffic from the respective R sources. The switch comprises an arbitrator which receives information from the destinations regarding if they can receive data or not, and from the K segments about the traffic they have for different destinations.

The present invention pertains to a method for switching traffic from N sources to M destinations, where M and N are each an integer greater than or equal to 2. The method comprises the steps of receiving traffic from the N sources at input ports of K segments, where K is greater than or equal to 2 and is an integer. Each segment receiving traffic from R of the N sources where $1 \leq R < N$ and is an integer. Then there is the step of sending traffic from any segment to a destination through an output port of an arbitrator which connects to each segment.

The present invention pertains to an arbitrator which receives information from M destinations regarding if they can receive data or not arising from N sources, and from K segments about the traffic they have for different destinations arising from the N sources. Each segment has input ports having a line rate L1, where K and M and N are each an integer greater than or equal to 2. The arbitrator comprises output ports each having a line rate L2, and a combination of an input port and output port together form a queue/dequeue node having a bandwidth of $N/K*L1+M*L2$. The arbitrator comprised an arbitrator controller that selects which destination is to receive traffic from a corresponding source and allows the traffic to flow through an output port to the destination.

The present invention pertains to a segment which receives traffic from R of N sources, where 1 is less than or equal to R which is less than N and is an integer, and N is an integer greater than or equal to 2. The segment comprises input ports, each having a line rate L1, which receive traffic from the respective R sources. The segment comprises queues associated with destinations which store traffic received at the input ports for the destination.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
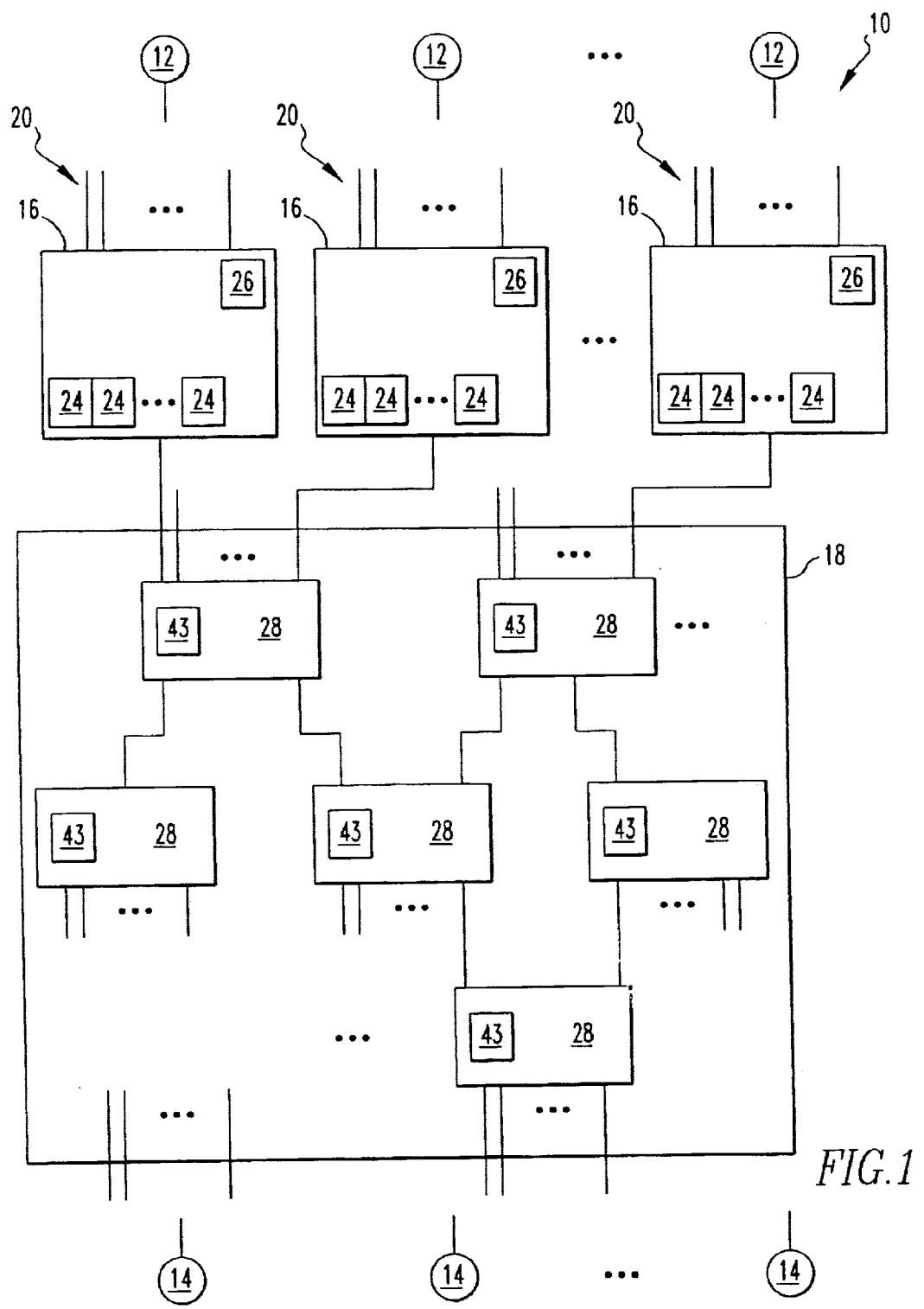
FIG. 1 is a schematic representation of a switch of the present invention.

Referring now to the drawings wherein like reference numerals refer to similar or identical parts throughout the several views, and more specifically to FIG. 1 thereof, there is shown a switch 10 for switching traffic from N sources 12 to M destinations 14, where M and N are each an integer greater than or equal to 2. The switch 10 comprises K segments 16, where K is greater than or equal to 2 and is an integer. Each segment 16 receiving traffic from R of the N sources 12, where $1 \leq R < N$ and is an integer, and all K segments 16 in total receiving traffic from the N sources 12. Each segment 16 collecting and queuing traffic from the respective R sources 12. The switch 10 comprises an arbitrator 18 which receives information from the destinations 14 regarding if they can receive data or not, and from the K segments 16 about the traffic they have for different destinations 14.

Preferably, each segment 16 includes input ports 20, each having a line rate L1, which receive traffic from corresponding sources 12. Preferably, the arbitrator 18 includes the output ports 22 each having a line rate L2, and a combination of an input port 20 and output port 22 together form a queue/dequeue node having a bandwidth of N/K*L1+M*L2. Each segment 16 preferably has queues 24 associated with destinations 14 which store traffic received at the input ports 20 for the destinations 14.

Preferably, each segment 16 has a controller 26 which places traffic received at an input port 20 into a queue 24 corresponding with the traffic's destinations 14. Traffic in a queue 24 is preferably either a unicast connection type or a multicast connection type. Preferably, the arbitrator 18 selects a destination and then an associated queue 24 having traffic for that destination 14, and dequeues the traffic in the associated queue 24 with the destination through an output port 22.

The arbitrator 18 preferably has dequeueing intervals in which traffic is sent to destinations 14 and wherein each segment 16 sends the arbitrator 18 buffer occupancy information for all destinations 14 and queues 24 for each dequeueing interval of the arbitrator 18. Preferably, the arbitrator 18 is comprised of arbitrator portions 28, each arbitrator portion 28 associated with predetermined segments 16 and the arbitrator portions 28 and segments 16 form into a hierarchy.

The arbitrator 18 preferably selects a destination 14 according to either weighted round robin or strict round robin. Preferably, the queues 24 are priority queues 24.

The present invention pertains to a method for switching traffic from N sources 12 to M destinations 14, where M and N are each an integer greater than or equal to 2. The method comprises the steps of receiving traffic from the N sources 12 at input ports 20 of K segments 16, where K is greater than or equal to 2 and is an integer. Each segment 16 receiving traffic from R of the N sources 12 where $1 \leq R < N$ and is an integer. Then there is the step of sending traffic from any segment 16 to a destination through an output port 22 of an arbitrator 18 which connects to each segment 16.

Preferably, the receiving step includes the step of receiving traffic at an input port 20 having a line rate of L1 and the sending step includes the step of sending traffic from an output port 22 of the arbitrator 18 at a line rate of L2 and a combination of an input port 20 and output port 22 together form a queue/dequeue node having a bandwidth of N/K*L1+M*L2. The receiving step preferably includes the step of placing traffic received at an input port 20 into a queue 24 in the segment 16 corresponding with the traffic destination.

Preferably, after the receiving step, there is the step of selecting a destination 14 by the arbitrator 18. After the destination selecting step, there is preferably the step of selecting a queue 24 within the destination 14. Preferably, after the queue selecting a step there is the step of selecting a unicast or multicast connection within the queue 24. After the connection selecting step, there is preferably the step of selecting a segment 16 with traffic for the connection.

The present invention pertains to an arbitrator 18 which receives information from M destinations 14 regarding if they can receive data or not arising from N sources 12, and from K segments 16 about the traffic they have for different destinations 14 arising from the N sources 12. Each segment 16 has input ports 20 having a line rate L1, where K and M and N are each an integer greater than or equal to 2. The arbitrator 18 comprises output ports 22 each having a line rate L2, and a combination of an input port 20 and output port 22 together form a queue/dequeue node having a bandwidth of N/K*L1+M*L2. The arbitrator 18 comprises an arbitrator controller 43 that selects which destination 14 is to receive traffic from a corresponding source and allows the traffic to flow through an output port 22 to the destination 14.

Preferably, the arbitrator controller 43 defines the queueing intervals in which traffic is sent to destinations 14 and the arbitrator controller 43 receives buffer occupancy information from each segment 16 for all destinations. The arbitrator controller 43 preferably selects a destination according to either weighted round robin or strict round robin.

The present invention pertains to a segment 16 which receives traffic from R of N sources 12, where 1 is less than or equal to R which is less than N and is an integer, and N is an integer greater than or equal to 2. The segment 16 comprises input ports 20, each having a line rate L1, which receive traffic from the respective R sources 12. The segment 16 comprises queues 24 associated with destinations 14 which store traffic received at the input ports 20 for the destination 14.

Preferably, the segment includes a controller 26 which places traffic received at an input port 20 into a queue 24 corresponding with the traffic's destinations. Traffic in a queue 24 can preferably be either a unicast connection type or a multicast connection type. Preferably, the queues 24 are priority queues.

Figure 2:
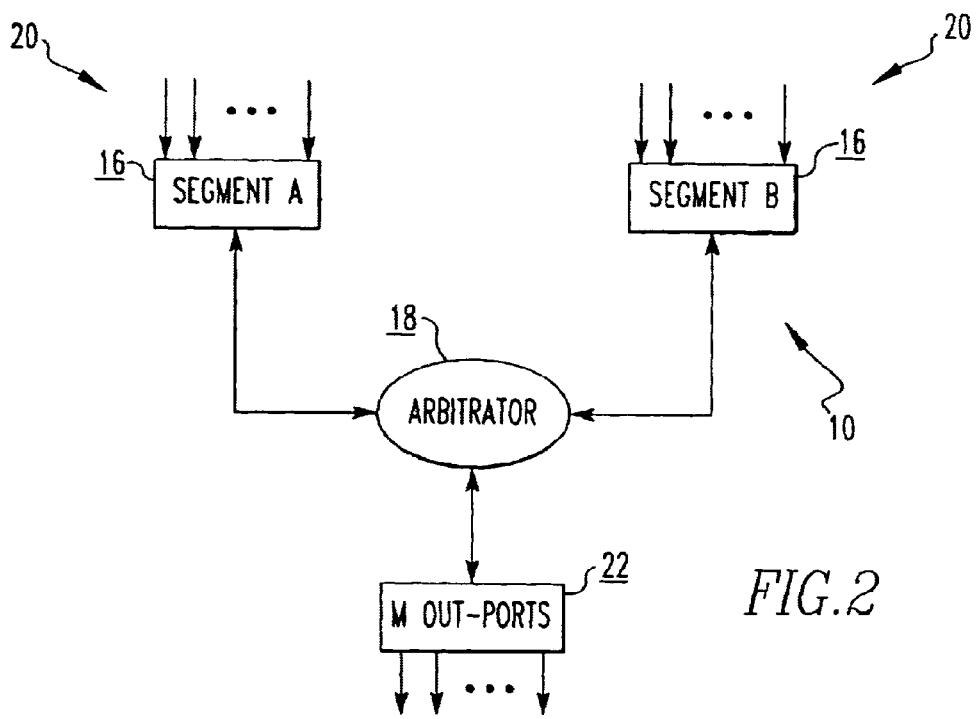
FIG. 2 is a schematic representation of a switch of the present invention.

In the operation of the invention, and referring to FIG. 2, the following describes the approach with a single level arbitrator 18 with two segments 16. It can be extended to any number of levels. Suppose there is traffic coming from N sources 12 into a network switch node, and after it is appropriately queued and dequeued it goes to M destinations 14. Traffic queued to different prioritized queues 24 from each input port 20 can go to any one (unicast connections) or more (multicast connections) of the M output ports 22. With one level of arbitrator 18 each of the two segments 16 collect and queue the traffic from N/2 sources 12 (unlike single point queueing and dequeueing where they have to queue and dequeue traffic from N sources 12). The queueing approach used here is per-destination and per priority queue within a destination. The arbitrator 18 based on a fixed algorithm (described in the following section) does dequeueing for each dequeue interval.

The arbitrator 18 receives information from the destinations 14 regarding if they can receive data or not, and from the two segments 16 about the buffer occupancy for different destinations 14 and priority queues 24. Each segment 16 can send the arbitrator 18 only enough information for the current dequeueing interval about buffer occupancy for all destinations 14 and queues 24. The arbitrator 18 selects the destination 16 first, then a queue 24 within that destination 16, and then one of the two segments 16; using, say, weighted round-robin at each level. Once the arbitrator 18 makes the final decision it will send the required dequeue command to the appropriate segment 16.

For example, if the input ports 20 have a line rate of L1, and the output ports 22 have a line rate of L2 then, the bandwidth capability required at each queue/dequeue node with single point dequeueing and multi level dequeueing as proposed above would be:

Single point queue/dequeue: N*L1+M*L2

Multi level queue/dequeue with two segments 16: N/2*L1+M*L2

Multi level queue/dequeue with four segments 16: N/4*L1+M*L2

Extending this to k segments 16,

Multi level queue/dequeue with k segments 16: N/k*L1+M*L2

This clearly shows that with segmented queueing/dequeueing each queue/dequeue node need to support only a fraction of the total bandwidth, which makes it feasible to build high speed scalable switching networks. Also, with a multi level arbitrator 18, the arbitrator 18 design can be very simple.

Figure 3:
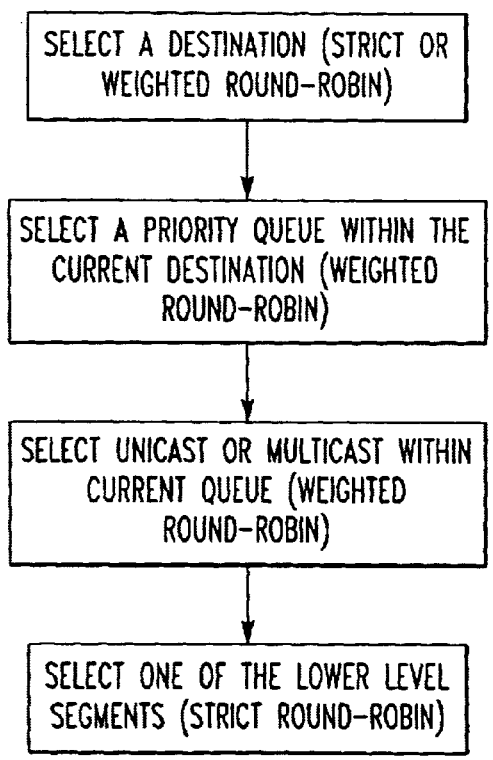
FIG. 3 is a flow chart of a method of the present invention.

Any fair algorithm can be used to implement the dequeue algorithm within the arbitrator 18. The algorithm has to be fair in allocating the bandwidth not only across destinations 14 and priority queues 24 within each destination, but across the different segments 16. A novel algorithm for an arbitrator 18 design is explained here and with reference to FIG. 3.

If all destinations 14 have same bandwidth capacity then a destination is selected using strict round-robin; if not, a destination can be selected using weighted round-robin. If a selected destination doesn't have traffic to be dequeued then that dequeue interval can be wasted. After selecting a destination, a priority queue 24 within that destination is selected using weighted round-robin. If the selected queue doesn't have traffic to be dequeued in all of the lower level segments 16, then the queue 24 next in priority will be selected until a queue 24 with traffic queued is found. After selecting a priority queue, a unicast or multicast connection type is selected within that priority queue 24, based on weighted round-robin. If the selected connection type doesn't have traffic queued in all of the lower level segments 16 then other connection type will be selected. Multiple weights can be used in selecting a connection type, based on the queueing algorithm used for queueing incoming traffic, and the current congestion state of all lower level segments 16. After selecting a connection type, then one of the lower level segments 16 is selected using a strict round-robin until a segment 16 with traffic queued in the selected destination, priority queue, and connection type is found.

For an ATM switching node with N high speed input ports 20, and M high speed output ports 22, the memory bandwidth required for ATM cell queueing from N ports and cell dequeueing to M ports could be prohibitively high to implement it as a single point queuing and dequeueing. The current memory technology may not make it feasible to implement such a single point queueing and dequeueing logic. In such a situation, the queueing could be segmented and using arbitrator 18 approach dequeueing can be extended to any number of levels as required, making it feasible to implement a scalable switching node that can scale to any aggregate bandwidth.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch for switching traffic from N sources to M destinations, where M and N are each an integer greater than or equal to 2, comprising:

K segments, where K is greater than or equal to 2 and is an integer, each segment receiving traffic from R of the N sources, where $1 \leq R < N$ and is an integer, and all K segments in total receiving traffic from the N sources, each segment collecting and queuing traffic from the respective R sources; and an arbitrator which receives information from the destinations regarding if they can receive data or not, and from the K segments about the traffic they have for different destinations.

2. A switch as described in claim 1 wherein each segment includes input ports, each having a line rate L1, which receive traffic from corresponding sources, and the arbitrator includes output ports each having a line rate L2 and a combination of an input port and output port together form a queue/dequeue node having a bandwidth of N/K*L1+M*L2.

3. A switch as described in claim 2 wherein each segment has queues associated with destinations which store traffic received at the input ports for the destinations.

4. A switch as described in claim 3 wherein each segment has a controller which places traffic received at an input port into a queue corresponding with the traffic's destinations.

5. A switch as described in claim 4 wherein traffic in a queue can be either a unicast connection type or a multicast connection type.

6. A switch as described in claim 5 wherein the arbitrator selects a destination and then an associated queue having traffic for that destination, and dequeues the traffic in the associated queue with the destination through an output port.

7. A switch as described in claim 6 wherein the arbitrator has dequeueing intervals in which traffic is sent to destinations and wherein each segment sends the arbitrator buffer occupancy information for all destinations and queues for each dequeueing interval of the arbitrator.

8. A switch as described in claim 7 wherein the arbitrator can be comprised of arbitrator portions, each arbitrator portion associated with predetermined segments and the arbitrator portions and segments form into a hierarchy.

9. A switch as described in claim 8 wherein the arbitrator selects a destination according to either weighted round robin or strict round robin.

10. A switch as described in claim 9 wherein the queues are priority queues.

11. A method for switching traffic from N sources to M destinations, where M and N are each an integer greater than or equal to 2, comprising the steps of:

receiving traffic from the N sources at input ports of K segments, where K is greater than or equal to 2 and is an integer, each segment receiving traffic from R of the N sources where $1<=R<N$ and is an integer; and sending traffic from any segment to a destination through output port of an arbitrator which connects to each segment and which receives information from the destinations regarding if they can receive data or not, and from the K segments about the traffic they have for different destinations.

12. A method as described in claim 11 wherein the receiving step includes the step of receiving traffic at an input port having a line rate of L1 and the sending step includes the step of sending traffic from an output port of the arbitrator at a line rate of L2 and a combination of an input port and output port together form a queue/dequeue node having a bandwidth of N/K*L1+M*L2.

13. A method as described in claim 12 wherein the receiving step includes the step of placing traffic received at an input port into a queue in the segment corresponding with the traffic destination.

14. A method as described in claim 13 including after the receiving step there is the step of selecting a destination by the arbitrator.

15. A method as described in claim 14 including after the destination selecting step there is the step of selecting a queue in the segment.

16. A method as described in claim 15 including after the queue selecting a step there is the step of selecting a unicast or multicast connection within the queue.

17. A method as described in claim 16 including after the connection selecting step there is the step of selecting a segment with traffic for the connection.

18. An arbitrator which receives information from M destinations regarding if they can receive data or not arising from N sources, and from K segments about the traffic they have for different destinations arising from the N sources, each segment having input ports having a line rate L1, where K and M and N are each an integer greater than or equal to 2, comprising:
   output ports each having a line rate L2 and a combination of an input port and output port together form a queue/dequeue node having a bandwidth of N/K*L1+M*L2; and
   an arbitrator controller that selects which destination is to receive traffic from a corresponding source and allows the traffic to flow through an output port to the destination.

19. An arbitrator as described in claim 18 wherein the controller defines the queueing intervals in which traffic is sent to destinations and the controller receives buffer occupancy information from each segment for all destinations.

20. An arbitrator as described in claim 19 wherein the controller selects a destination according to either weighted round robin or strict round robin.

* * * * *